(No Model.)
L. ADRIANSE.
CLAMP.
No. 561,151.  Patented June 2, 1896.
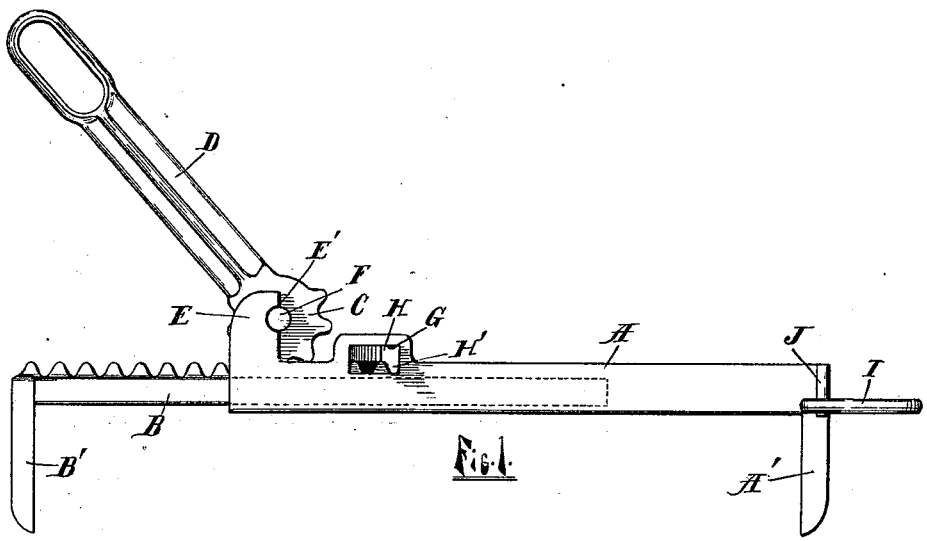
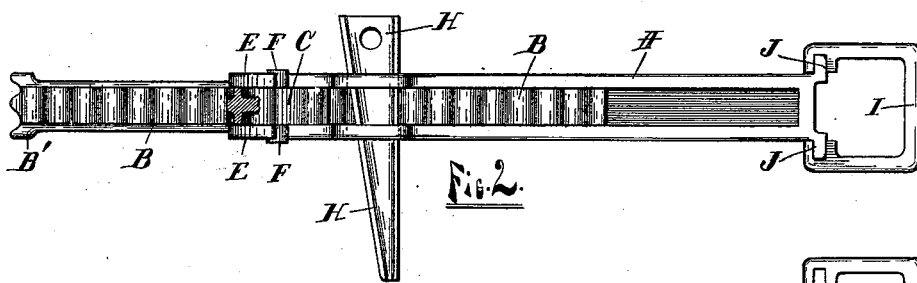
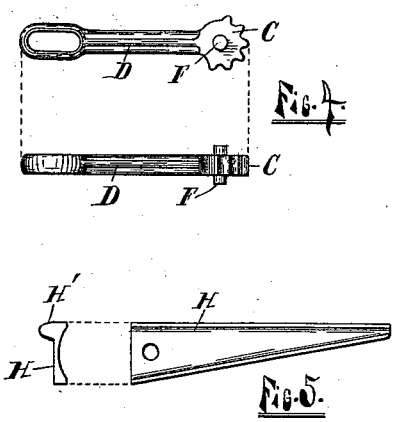
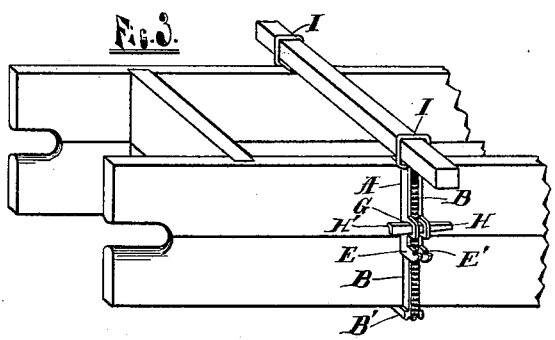
Witnesses
Lewis E. Flanders
Lois Moutton
Inventor
Lyne Adrianse
By Attorney
Luther V. Moutton

UNITED STATES PATENT OFFICE.

LYNE ADRIANSE, OF GRAND RAPIDS, MICHIGAN.

CLAMP.

SPECIFICATION forming part of Letters Patent No. 561,151, dated June 2, 1896.

Application filed January 20, 1896. Serial No. 576,241. (No model.)

*To all whom it may concern:*

Be it known that I, LYNE ADRIANSE, a citizen of the United States, residing at Grand Rapids, in the county of Kent and State of Michigan, have invented certain new and useful Improvements in Clamps; and I do hereby declare the following to be a full, clear, and exact description of the invention, such as will enable others skilled in the art to which it appertains to make and use the same.

My invention relates to improvements in clamps, and more especially to clamps for molders' flasks; and its object is to provide the same with certain new and useful features hereinafter more fully described, and particularly pointed out in the claims, reference being had to the accompanying drawings, in which—

Figure 1 is a side elevation of a device embodying my invention; Fig. 2, a plan view of the same; Fig. 3, a perspective of the same in use; Fig. 4, a detail showing a side and edge view of the pinion and handle, on a reduced scale; Fig. 5, a side and end elevation of the wedge, and Fig. 6 a detail of the bridge-holder.

Like letters refer to like parts in all of the figures.

A is a casing having sides and a bottom, and a projection A', which serves as one jaw of the clamp.

B is a rack adapted to slide longitudinally within said casing A and carries the other jaw B' of the clamp. Extending laterally from each side of said casing and at its end are the projections E, having the concavities E' in their edges, which serve as bearings for the oppositely-projecting lugs F F, forming a pivot-pin F of the pinion C, which pinion is provided with a handle D, and is adapted to engage the teeth of said rack B and move the same, bringing said jaws toward each other into engagement with the edges of the flask or other article to be held. Said pinion with its handle is not secured to said casing, but may be removed at any time, said bearing serving only as a fulcrum, and thus be available for any number of clamps in series. In the sides of said casing A are openings G to receive the wedge H, which has a rib H' on its lower side adapted to engage the teeth on the rack B. When said wedge is driven into one of said openings, said rib engages a tooth on said rack and its opposite edge engages the side of said openings, thus moving said rack a sufficient distance to allow said wedge to enter and engage both sides of said opening and lock said rack, preventing longitudinal movement of the same. By this arrangement after the flask has been clamped as firmly as possible by means of said pinion and handle said wedge may be driven into said opening and said flask clamped still more tightly and locked in that position. A bridge-holder I is attached to the casing A at its end opposite said projections E by means of lugs J on said casing, which lugs engage suitable openings in said holder. It is necessary at times to build bridgework across a flask to hold down the cope, and to facilitate this a clamp, with said bridge-holder attached, is clamped on each side of said flask, as shown in Fig. 3, and a bar of iron passed through the openings in said holders. When not needed, these holders may be removed from said clamps. By this arrangement I secure a cheap and durable clamp which requires no machine-work in its manufacture and may be made entirely of cast metal.

Having thus fully described my invention, what I claim is—

1. In a clamp, in combination with a rack, a casing, and clamping-jaws on said rack and casing, projections on each side of said casing having concavities in their sides, a pinion having a handle, and oppositely-projecting lugs detachably engaging said concavities, and means for holding said rack from moving in said casing substantially as described.

2. In a clamp, in combination, a rack, a casing having openings in its sides, clamping-jaws on said rack and casing, a pinion, a handle on said pinion and a wedge engaging the sides of said openings having a rib on its lower side engaging the teeth of said rack, substantially as described.

3. In combination with a molder's clamp having oppositely-projecting lugs, a bridge-holder attached thereto consisting of a casting having a central opening adapted to receive one end of a metal bar and recesses to engage said lugs, substantially as described.

4. In a clamp, in combination, a rack, a casing having openings in its sides, clamping-jaws on said rack and casing, projections on said casing having concaves in their sides, a pinion, a handle on said pinion, a pivot-pin in the axis of said pinion, a wedge engaging said openings, a rib on said wedge engaging said rack, lugs on said casing and a bridge-holder engaging said lugs, substantially as described.

In testimony whereof I affix my signature in presence of two witnesses.

LYNE ADRIANSE.

Witnesses:
LEWIS E. FLANDERS,
LUTHER V. MOULTON.